United States Patent
Su et al.

(10) Patent No.: US 8,422,337 B2
(45) Date of Patent: Apr. 16, 2013

(54) ULTRASONIC SYSTEM AND COMMUNICATION METHOD THEREOF

(75) Inventors: Chung-Yi Su, Hsinchu (TW); Yi-Chung Lee, Hsinchu (TW)

(73) Assignee: Lite-On IT Corporation, Taipei (TW)

( * ) Notice: Subject to any disclaimer, the term of this patent is extended or adjusted under 35 U.S.C. 154(b) by 379 days.

(21) Appl. No.: 12/840,384

(22) Filed: Jul. 21, 2010

(65) Prior Publication Data

US 2011/0134725 A1 Jun. 9, 2011

(30) Foreign Application Priority Data

Dec. 3, 2009 (CN) .......................... 2009 1 0252662

(51) Int. Cl.
*H04B 1/06* (2006.01)

(52) U.S. Cl.
USPC .......................................................... 367/134

(58) Field of Classification Search .................. 367/135, 367/134
See application file for complete search history.

(56) References Cited

U.S. PATENT DOCUMENTS

| | | | |
|---|---|---|---|
| 4,045,767 A | 8/1977 | Nishihara et al. | |
| 5,687,200 A * | 11/1997 | Berger | 375/363 |
| 7,310,286 B1 * | 12/2007 | Jarvis et al. | 367/134 |
| 2001/0009977 A1 * | 7/2001 | Sato et al. | 600/441 |
| 2003/0016412 A1 * | 1/2003 | Eilenberger et al. | 359/110 |
| 2003/0067662 A1 * | 4/2003 | Brewer et al. | 359/189 |
| 2004/0059225 A1 * | 3/2004 | Hao et al. | 600/458 |
| 2004/0208571 A1 * | 10/2004 | Shahar et al. | 398/79 |
| 2006/0079749 A1 * | 4/2006 | Hurst et al. | 600/407 |
| 2007/0069860 A1 * | 3/2007 | Akiyama et al. | 340/10.1 |
| 2008/0179053 A1 * | 7/2008 | Kates | 165/208 |
| 2009/0018599 A1 * | 1/2009 | Hastings et al. | 607/32 |

\* cited by examiner

*Primary Examiner* — Isam Alsomiri
*Assistant Examiner* — James Hulka
(74) *Attorney, Agent, or Firm* — Rabin & Berdo, P.C.

(57) ABSTRACT

An ultrasonic system including an ultrasonic transmitter and an ultrasonic receiver is provided. The ultrasonic transmitter emits a transmission signal, which includes a synchronous burst and multiple data bursts. The ultrasonic receiver receives a synchronous echo, and determines whether the amplitude of the synchronous echo is larger than a first threshold. If the amplitude of the synchronous echo is larger than the first threshold, then the ultrasonic receiver interprets the multiple data echoes corresponding to the data bursts to obtain a digital signal.

12 Claims, 2 Drawing Sheets

ULTRASONIC SYSTEM AND COMMUNICATION METHOD THEREOF

This application claims the benefit of People's Republic of China application Serial No. 200910252662.7, filed Dec. 3, 2009, the subject matter of which is incorporated herein by reference.

BACKGROUND OF THE INVENTION

1. Field of the Invention

The invention relates in general to an ultrasonic system, and more particularly to an ultrasonic system with communication function and a communication method thereof.

2. Description of the Related Art

The ultrasonic system is a system which measures physical quantities such as location, velocity and distance by means of emitting and receiving an ultrasound. In an ordinary ultrasonic system, the ultrasonic transmitter transforms a transmission signal into an ultrasonic signal and further transfer the ultrasonic signal outward. Relatively, the ultrasonic receiver receives an ultrasonic signal, and further transforms the ultrasonic signal into a voltage signal or a current signal. Through the calculation of time of flight (that is, the time different between transmitting an ultrasonic signal and receiving said ultrasonic signal), physical quantities such as location, velocity and distance can be obtained accordingly.

An ordinary ultrasonic system only needs to be equipped with a single ultrasonic transmitter and a single ultrasonic receiver for measuring said physical quantities. However, when the ultrasonic system is used for control purpose, multiple ultrasonic transmitters and multiple ultrasonic receivers may be employed. To simultaneously control multiple ultrasonic transmitters and ultrasonic receivers, additional switch, circuit, or communication module such as Bluetooth, WiFi, WiMax, and IR is used in the control of the communication between the ultrasonic transmitters and ultrasonic receivers. Since additional elements or devices are employed, extra costs will incur accordingly.

SUMMARY OF THE INVENTION

The invention is directed to an ultrasonic system and a communication method thereof. Through the ultrasonic transmission/reception function of an ultrasonic system and the norm time-of-flight window and the norm information window, an ultrasonic system with communication function and low cost will thus be realized.

According to a first aspect of the present invention, an ultrasonic system including an ultrasonic transmitter and an ultrasonic receiver is provided. The ultrasonic transmitter emits a transmission signal, which includes a synchronous burst and multiple data bursts. The ultrasonic receiver receives a synchronous echo, and determines whether the amplitude of the synchronous echo is larger than a first threshold. If the amplitude of the synchronous echo is larger than the first threshold, then the ultrasonic receiver interprets the multiple data echoes corresponding to the data bursts to obtain a digital signal.

According to a second aspect of the present invention, a communication method of an ultrasonic system is provided. The communication method includes the following steps of emitting a transmission signal, which includes a synchronous burst and multiple data bursts; receiving a synchronous echo and determining whether the amplitude of the synchronous echo is larger than a first threshold; and interpreting the multiple data echoes corresponding to the data bursts to obtain a digital signal if the amplitude of the synchronous echo is larger than the first threshold.

The above and other aspects of the invention will become better understood with regard to the following detailed description of the preferred but non-limiting embodiment(s). The following description is made with reference to the accompanying drawings.

BRIEF DESCRIPTION OF THE DRAWINGS

FIG. 2 shows a wave pattern of an ultrasonic system according to a preferred embodiment of the invention; and.

DETAILED DESCRIPTION OF THE INVENTION

The invention provides an ultrasonic system and a communication method thereof. Through the ultrasonic transmission/reception function of an ultrasonic system and the norm time-of-flight window and the norm information window, an ultrasonic system with communication function and low cost will thus be realized.

Figure 1:
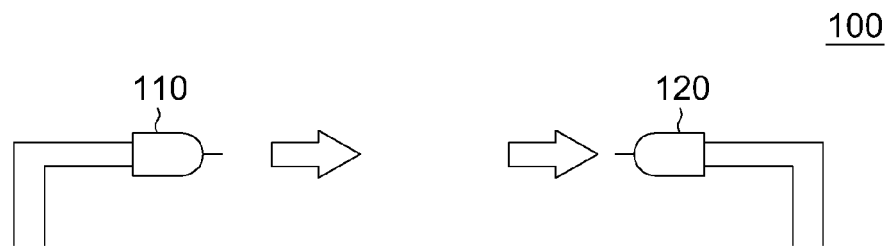
FIG. 1 shows an ultrasonic system according to a preferred embodiment of the invention.
Figure 2:
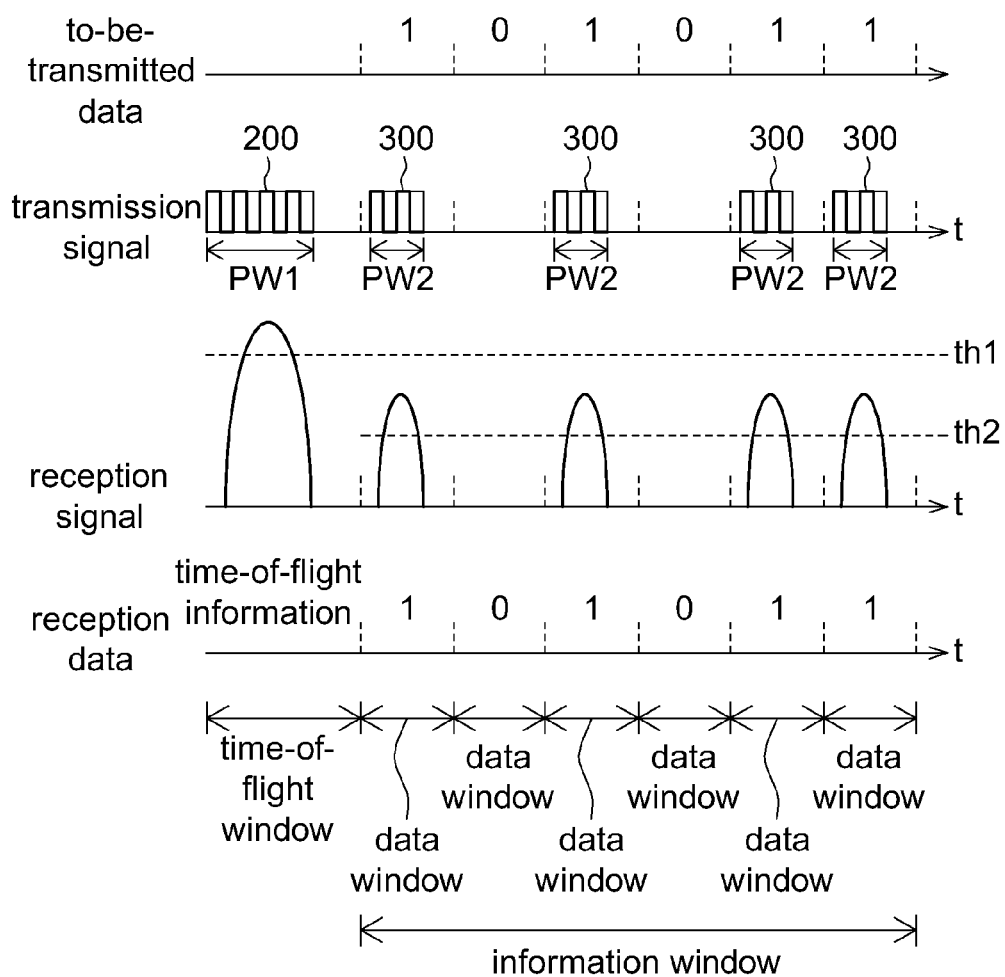

Referring to both FIG. 1 and FIG. 2. FIG. 1 shows an ultrasonic system according to a preferred embodiment of the invention. FIG. 2 shows a wave pattern of an ultrasonic system according to a preferred embodiment of the invention. In FIG. 1, the ultrasonic system 100 includes an ultrasonic transmitter 110 and an ultrasonic receiver 120. The ultrasonic transmitter 110 is coupled to a corresponding previous-stage circuit (not illustrated in the diagram), and the ultrasonic receiver 120 is coupled to a corresponding next-stage circuit (not illustrated in the diagram). The ultrasonic transmitter 110 and the ultrasonic receiver 120 can be disposed in the same electronic device (such as an ultrasonic lamp) or in different electronic devices, and no specific restriction is imposed.

In FIG. 2, the transmission of data "101011" is taken for example, but the invention is not limited to such exemplification. After the ultrasonic system 100 activates a communication mode, the ultrasonic transmitter 110 emits a transmission signal, which includes a synchronous burst 200 and multiple data bursts 300. The transmission signal substantially is a burst width modulation (PWM) signal, the synchronous burst 200 and the data bursts 300 respectively are formed by a plurality of bursts, and the width of PW1 of the synchronous burst 200 is larger than the width PW2 of the data bursts 300, that is, the synchronous burst 200 has more bursts than the data burst 300. As indicated in FIG. 2, the multiple data bursts of the transmission signal substantially correspond to the content of the to-be-transmitted data. If the to-be-transmitted data is "1", then the data burst exists. To the contrary, if the to-be-transmitted data is "0", then the data burst does not exist.

The ultrasonic transmitter 110 transmits the synchronous burst 200 first before transmitting the data bursts 300. As disclosed above, the synchronous burst 200 is formed by more bursts, so the synchronous echo correspondingly generated has larger amplitude. Thus, the ultrasonic receiver 120 determines whether the synchronous echo corresponds to the synchronous burst 200 in dependence of the size of the amplitude of the synchronous echo being received, and then determines whether to enter the communication mode.

The ultrasonic receiver 120 receives a synchronous echo corresponding to the synchronous burst 200 within a time-of-flight window. The duration of the time-of-flight window can be a parameter in dependence of the distance between the ultrasonic transmitter 110 and the ultrasonic receiver 120. When the ultrasonic receiver 120 receives the synchronous echo within the time-of-flight window, the ultrasonic receiver 120 determines whether the amplitude of the synchronous echo is larger than a first threshold th1. If the amplitude of the synchronous echo is not larger than the first threshold th1, then the ultrasonic receiver 120 determines that the received echo is not the synchronous echo corresponding to the synchronous burst 200, and will not enter the communication mode. That is, the ultrasonic receiver 120 will not interpret the echoes received subsequently.

If the amplitude of the synchronous echo is larger than the first threshold th1, then the ultrasonic receiver 120 determines that the received echo is the synchronous echo corresponding to the synchronous burst 200 and enters the communication mode accordingly. Then, the ultrasonic receiver 120 receives multiple data echoes corresponding to multiple data bursts 300 in an information window, wherein each data echo corresponds to a data window. The ultrasonic receiver 120 interprets the data echoes. The ultrasonic receiver 120 determines whether the amplitude of the data echo is larger than a second threshold th2. If the amplitude of the data echo is larger than or equal to the second threshold th2, then the ultrasonic receiver 120 interprets the data echo as data "1". If the amplitude of the data echo is smaller than the second threshold th2 (the amplitude could be 0), then the ultrasonic receiver 120 interprets the data echo as data "0". Thus, the interpreted data form a digital signal which corresponds to a command enabling the next-stage circuit of the ultrasonic receiver 120 to perform corresponding operations of said command.

In the application of a device with multiple ultrasonic transmitters and multiple ultrasonic receivers, a synchronous burst emitted by one of the ultrasonic transmitters may be received by all of the ultrasonic receivers. However, the ultrasonic transmitter may only intend to communicate with some of the ultrasonic receivers only, not all of them. Thus, the digital signal may correspond to an identification code, which allows the ultrasonic receiver 120 to determine whether the ultrasonic transmitter 110 is a predetermined ultrasonic transmitter. If the ultrasonic transmitter 110 is not a predetermined ultrasonic transmitter, this implies that the ultrasonic receiver 120 is not the ultrasonic receiver to be communicated, the echoes after the information window will be neglected, and the communication mode terminates.

Figure 3:
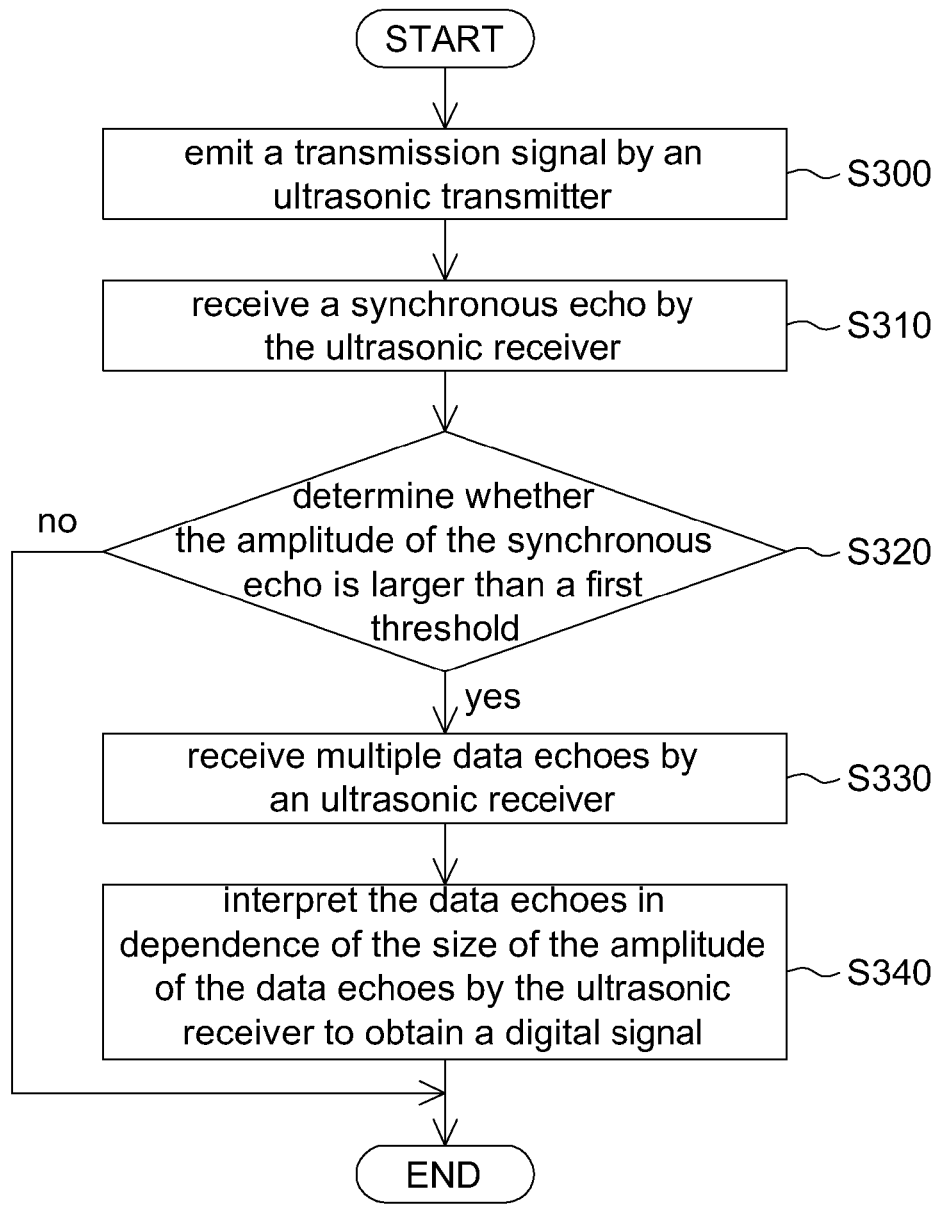
FIG. 3 shows a flowchart of a communication method of an ultrasonic system according to a preferred embodiment of the invention.

The invention further provides a communication method of an ultrasonic system. The ultrasonic system includes an ultrasonic transmitter and an ultrasonic receiver. Referring to FIG. 3, a flowchart of a communication method of an ultrasonic system according to a preferred embodiment of the invention is shown. In step S300, the ultrasonic transmitter emits a transmission signal, which includes a synchronous burst and a plurality of data bursts. In step S310, the ultrasonic receiver receives a synchronous echo. In step S320, whether the amplitude of the synchronous echo is larger than a first threshold is determined. If the amplitude of the synchronous echo is larger than the first threshold, then the method proceeds to step S330, the ultrasonic receiver receives multiple data echoes. Afterwards, the method proceeds to step S340, the ultrasonic receiver interprets the data echo in dependence of the size of the amplitude of the data echo so as to obtain a digital signal.

The details of the theories of the communication method of ultrasonic system are already disclosed in the ultrasonic system 100 and its wave pattern, and are not repeated here.

The ultrasonic system and the communication method thereof disclosed in the above embodiments of the invention have many advantages exemplified below:

An ultrasonic system and a communication method thereof are disclosed in above embodiments of the invention. Through the ultrasonic transmission/reception function of an ultrasonic system which receives multiple synchronous echoes within a norm time-of-flight window and receives multiple data echoes within a norm information window, whether the received echoes are the predetermined communication data type is determined in dependence of the size of the amplitude of the synchronous echo and the data echo, and an ultrasonic system with communication function and low cost will thus be realized. The ultrasonic transmitter and the ultrasonic receiver of the ultrasonic system have mutual communication so that data can be transmitted therebetween. Therefore, wireless transmission/reception function can be realized without additional circuits. In addition, unlike the communication module (such as Bluetooth or WIMAX) commonly seen in the market, the ultrasonic system can be used in an ultrasonic lamp without extra installation, hence having the advantage of low cost.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An ultrasonic system, comprising:
   an ultrasonic transmitter for emitting a transmission signal, the emitted transmission signal including a synchronous burst and a plurality of data bursts, wherein the synchronous burst serves to activate a communication mode, and the data bursts represent data information being transmitted; and
   an ultrasonic receiver for receiving a synchronous echo and determining whether the amplitude of the synchronous echo is larger than a first threshold,
   wherein if the amplitude of the synchronous echo is larger than the first threshold, then the ultrasonic receiver interprets a plurality of data echoes corresponding to the data bursts back to the data information.

2. The ultrasonic system according to claim 1, wherein the synchronous echo corresponds to a time-of-flight window, and each of the data echoes corresponds to one of a plurality of data windows of an information window.

3. The ultrasonic system according to claim 1, wherein the transmission signal is a PWM (burst width modulation) signal, the synchronous burst and the data burst are formed by a plurality of bursts, and the width of the synchronous burst is larger than that of the data bursts.

4. The ultrasonic system according to claim 1, wherein the ultrasonic receiver determines whether the amplitude of the data echoes is larger than a second threshold, and wherein the ultrasonic receiver regards the data echo as denoting data "1" if the amplitude of the data echo is larger than or equal to the second threshold, and the ultrasonic receiver regards the data echo as denoting data "0" if the amplitude of the data echo is smaller than the second threshold.

5. The ultrasonic system according to claim 1, wherein the data information corresponds to an identification code.

6. The ultrasonic system according to claim 1, wherein the data information corresponds to a command.

7. A communication method of ultrasonic system, comprising steps of:
- emitting a transmission signal, wherein the transmission signal include a synchronous burst and a plurality of data bursts, and wherein the synchronous burst serves to activate a communication mode, and the data bursts represent data information being transmitted;
- receiving a synchronous echo and determining whether the amplitude of the synchronous echo is larger than a first threshold; and
- interpreting a plurality of data echoes corresponding to the data bursts back to the data information if the amplitude of the synchronous echo is larger than the first threshold.

8. The communication method of ultrasonic system according to claim 7, wherein the synchronous echo corresponds to a time-of-flight window, and each of the data echoes corresponds to one of a plurality of data windows of an information window.

9. The communication method of ultrasonic system according to claim 7, wherein the transmission signal is a PWM signal, the synchronous burst and the data burst are formed by a plurality of bursts, and the width of the synchronous burst is larger than that of the data bursts.

10. The communication method of ultrasonic system according to claim 7, further comprising:
- determining whether the amplitude of the data echoes is larger than a second threshold;
- regarding the data echo as denoting data "1" if the amplitude of the data echo is larger than or equal to the second threshold; and
- regarding the data echo as denoting data "0" if the amplitude of the data echo is smaller than the second threshold.

11. The communication method of ultrasonic system according to claim 7, wherein the data information corresponds to an identification code.

12. The communication method of ultrasonic system according to claim 7, wherein the data information corresponds to a command.

* * * * *